May 27, 1958          B. B. REILLY          2,836,169

DIRECT FIRED HOT AIR HEATING APPARATUS

Filed Feb. 27, 1956          2 Sheets-Sheet 1

INVENTOR.
BERTRAM B. REILLY.
BY
Christy, Parmelee & Strickland
ATTORNEYS.

May 27, 1958 B. B. REILLY 2,836,169
DIRECT FIRED HOT AIR HEATING APPARATUS
Filed Feb. 27, 1956 2 Sheets-Sheet 2

United States Patent Office 2,836,169
Patented May 27, 1958

2,836,169

DIRECT FIRED HOT AIR HEATING APPARATUS

Bertram B. Reilly, Pittsburgh, Pa., assignor to Dravo Corporation, Pittsburgh, Pa., a corporation of Pennsylvania Application February 27, 1956, Serial No. 568,042

1 Claim. (Cl. 126—110)

The invention relates to heaters designed and intended primarily for use in industrial plants, and consists in certain and useful improvements in the construction of such heaters.

In United States Letters Patent 2,529,574 granted November 14, 1950, and owned in common with the inventor hereof, a heater of the general type of which the improvements of my invention find utility is illustrated and described.

The heater of said Letters Patent comprises a combustion chamber arranged within and spaced from the walls of an outer housing or casing. Fuel is burned in the combustion chamber and the products of combustion flow from the chamber through the passages of a bank of heat exchange tubes to an exhaust. The heat-exchange tubes, communicating at one end with the interior of the combustion chamber and at opposite end with the exhaust, may be arranged in the space between the walls of the combustion chamber and the outer casing, and one or more fans, are arranged to impel air through the spaces between the walls of the combustion chamber and the outer casing to discharge outlets. The streams of air, flowing over the hot external surfaces of said heat-exchange tubes and combustion chamber, are heated to desired degree and emerged through said outlets to heat the room within the factory, or shop, or other rooms or space to be heated.

In the present invention the method of conducting the combustion gases from the combustion chamber to the heat-exchange tubes is greatly improved to give increased heating efficiency and other advantages hereinafter set forth.

One object of the invention is to increase the efficiency of combustion of fuel within the combustion chamber by withdrawing the combustion gases at an extreme distance from the burner, thereby causing the products of combustion to take a longer route through the chamber and to minimize short circuiting.

Another object of the invention is to increase the heat exchange rate of the combustion chamber surface by forcing the combustion gases to scrub the sides and top of the chamber.

Another object of the invention is to increase secondary cooling surfaces thereby increasing the life of the combustion gas manifold by air cooling all surfaces exposed to heat of combustion.

Another object of the invention is to provide air cooling of the burner box thereby protecting burner equipment from excessive temperatures and provide a radiation shield for the front of the heater by means of cooling air to control and protect regulatory equipment normally mounted on the front face of the heater from excessive temperatures.

These and other objects will be apparent as the description proceeds with reference to the accompanying drawings wherein.

Figure 4:
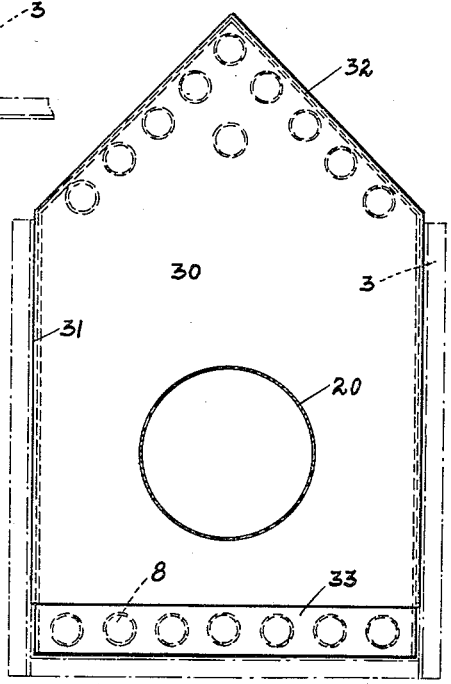
Fig. 4 shows in elevation the front face of the combustion gas manifold.

Referring now in detail to the drawings, reference character 1 indicates the heater generally comprising a combustion chamber 2 supported in any suitable manner such as by the supporting members 3 mounted adjacent each end of the chamber and at opposite sides thereof. The combustion chamber is shown as being polygonal in cross section having a front wall 4. A combustion gas manifold 5 is disposed in spaced relation to the front wall 4 of the combustion chamber and is similar thereto in shape, except that it has a rectangular bottom portion as shown in Fig. 4 of the drawings. The front face 4 of the combustion chamber and the rear face 6 of the combustion gas manifold 5 have a plurality of registering openings therein connected by tubes 7 which conduct combustion gases from the combustion chamber into the manifold 5. Beneath the combustion chamber 2 are heat exchange tubes 8 spaced transversely of the manifold 5. These tubes may be of any suitable number and connect the interior of the manifold 5 with a chamber 9 having an outlet 10 to a stack (not shown). The tubes 8 may be supported in any suitable manner as by the member 11 passing beneath the tubes and secured to the combustion chamber front support members 3. A suitable angular member such as 12 may also be connected beneath the chamber 9 and to the combustion chamber rear support members 3.

The combustion chamber, manifold 5 and heat exchange tubes 8 are enclosed by a suitable heater casing 13 disposed in spaced relation thereto. Adjacent the bottom of the casing, in spaced relation to the heat exchange tubes 8 and the base of the heater, is a suitable partition 14 extending from wall to wall of the casing dividing it into two chambers. Beneath the partition 14, the casing is provided with a suitable number of louvered openings 15 through which air is drawn into the casing. A suitable number of openings 16 are provided in the manifold member 14 and connected therewith are blower fans 17 driven by a common shaft 18 connected with a suitable motor (not shown) and all disposed beneath the partition member 14. The front wall of the casing 13, manifold 5 and the front wall 4 of the combustion chamber have suitable openings therein receiving burner tube 20 connecting the interior of the combustion chamber 2 with the exterior of the casing. A suitable fuel combustion burner (not shown) extends into the ring 20 for the combustion of fuel within the combustion chamber 2. The top wall 21 has suitable openings therein within which are mounted suitable louvered cowls 23 through which heated air is discharged into the space or room to be heated.

Figure 2:
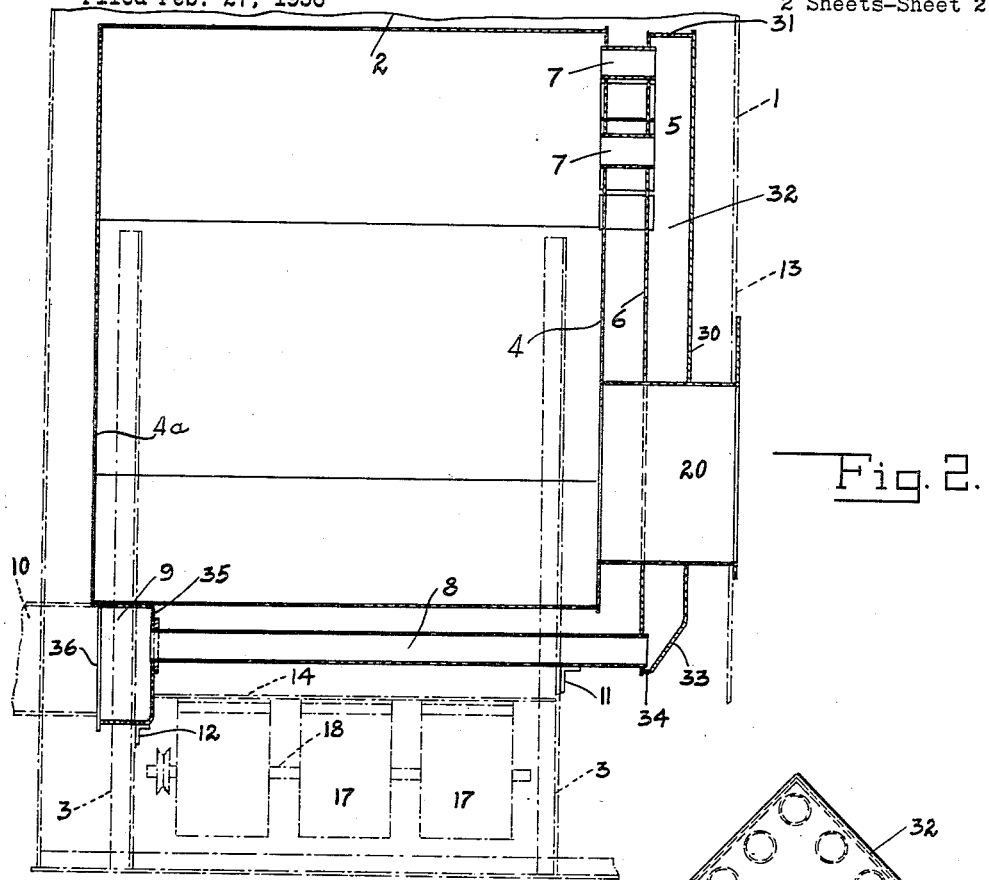
Fig. 2 shows a section through the heater taken on lines II—II of Fig. 1 showing construction of the combustion gas manifold.
Figure 3:
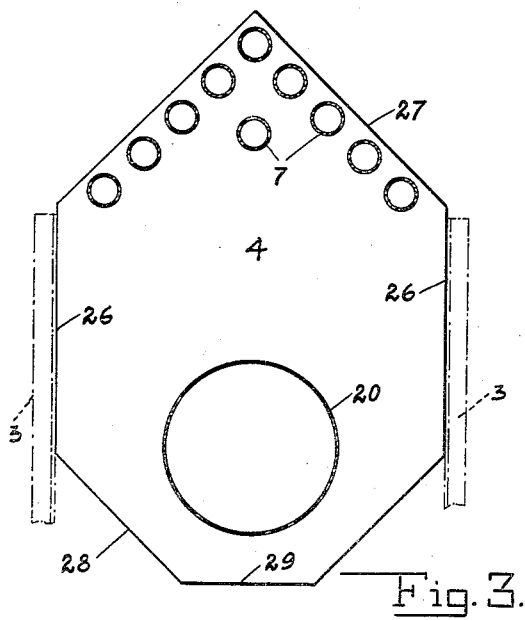
Fig. 3 shows in elevation the front face of the combustion chamber.

The combustion chamber 2 comprises, a front wall 4 and rear wall 4a to which are connected vertical side walls 26, inclined top walls 27 which converge at the center line of the chamber, inclined bottom side walls 28 and the bottom wall 29. Adjacent the bottom wall of the chamber is a suitable opening in front wall 4 within which is mounted the burner tube 20. Adjacent the top of front wall 4 and extending in a direction transversely of each top wall 27 are a plurality of openings within wall 4 which receive the tubes 7. One or more such openings with tubes 7 therein may be disposed between the first named openings and tubes 7. The combustion gases manifold 5 is a hollow structure comprising the rear wall 6 and front wall 30 which are connected by side walls 31, converging top walls 32, an inwardly sloping extension 33 of front wall 30 and a bottom wall 34. As shown in Figs. 2 and 4 of the drawings, the upper end of the manifold 5 conforms to the shape of the upper portion of combustion chamber 2, and manifold rear wall 6 has openings therein registering with openings in combustion chamber front wall 4. The ends of tubes 7 are seated in such manifold rear wall openings connecting the interior of manifold 5 with the interior of combustion chamber 2. The bottom of rear wall 6 of manifold 5, Fig. 4, is rectangular. Spaced transversely thereof, adjacent bottom wall 34, are a plurality of openings through which extend the heat exchange tubes 8 in communication with the interior of the member 5. By reason of the inclined extension 33 of front wall 30 of member 5, the gases flowing downwardly therethrough are deflected into the tubes 8. Adjacent the rear of the combustion chamber 2 and beneath the bottom wall 29 thereof is the duct 9 in the form of a closed hollow rectangular member having the front wall 35 thereof provided with suitable openings into which the heat-exchange tubes 8 extend. The rear wall 36 of the member 9 has a suitable opening therein connected to an exhaust stack (not shown) by the conduit 10 extending through the heater casing for this purpose. Preferably the conduit 10 may be connected with an exhaust fan (not shown) which may be driven by the common fan shaft 18. In this manner the exhaust fan provides forced draft of the combustion gases from the combustion chamber 2 through the manifold 5 and heat exchange tubes 8. The exhaust fan may in turn exhaust the combustion gas into the atmosphere exteriorly of the building or into a stack (not shown).

Figure 1:
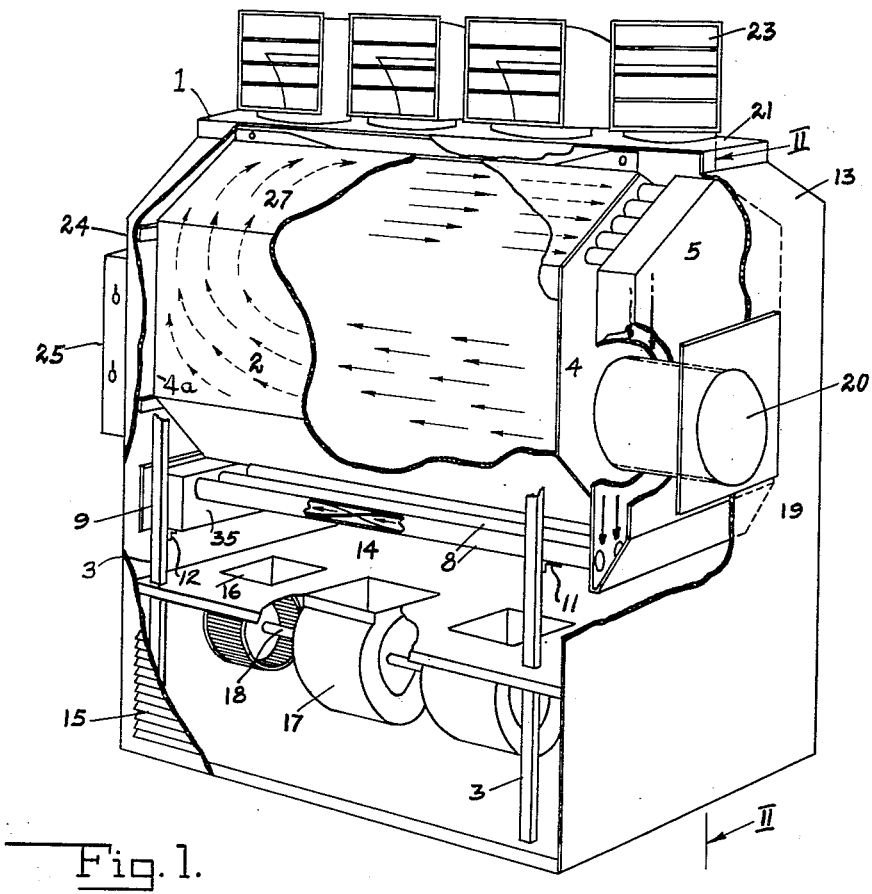
Fig. 1 is a perspective front elevation view of the heater having portions thereof broken away.
Figure 5:
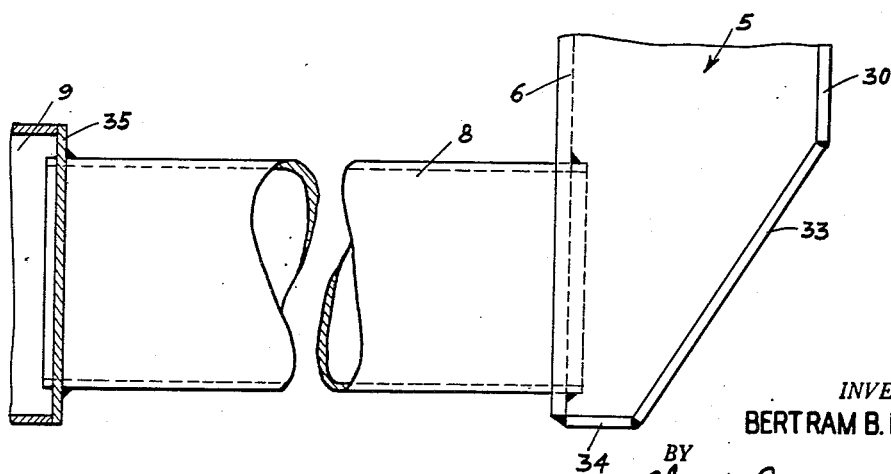
Fig. 5 shows in enlarged detail the connection between the heat-exchange tubes and the combustion gas manifold.

In operation of the heater, combustion fuel and combustion air are preferably fed under pressure to a suitable burner (not shown) mounted in the burner tube 20. The products of combustion, as indicated by the arrows in Fig. 1, are projected inwardly of the combustion chamber to adjacent the rear wall thereof where they pass upwardly and forwardly along the top walls of the combustion chamber to the tubes 7 which discharge them into the manifold 5. The gases then pass downwardly through the manifold into the tubes 8 and conduit 9, through conduit 10 to the stack. Preferably an exhaust fan (not shown) attached to the conduit 10 provides for the forced circulation of the combustion gases in the manner described. If a fan is not used, then the stack (not shown) may be extended a sufficient distance above the building to provide the necessary draft. By reason of the combustion of the fuel taking place adjacent the bottom wall of the combustion chamber 2 and the hot combustion gases flowing upwardly and then reversely along the top wall of the combustion chamber, the combustion chamber walls are all heated to high temperatures. When the fans 17 are in operation, air within the room is drawn into the casing beneath the partition 14 and discharged through the openings 16 so as to flow upwardly about the heat exchange tubes 8 and between the inner face of the casing and the adjacent face of the combustion chamber so as to be heated by extraction of heat from the combustion chamber walls and then discharged through the louvered cowls 23 into the room. The manifold 5 by reason of the flow of combustion gases therethrough is likewise heated to a considerable degree and the air flowing upwardly between the front face 4 of the combustion chamber and the adjacent wall 13 of the casing wipes the manifold 5 extracting heat therefrom before passing out of the cowls 23. The combustion gases at their highest temperature flow out of the combustion chamber through the tubes 7 into the manifold 5. They impart considerable heat to the manifold 5 and to the heat exchange tubes 8 in passing therethrough so that the combustion gases passing to the atmosphere are at a relatively low temperature.

By reason of the manifold 5 being in spaced relation to the front face 4 of the combustion chamber and in spaced relation to the walls 13 of the casing, the manifold 5 not only acts as a heat exchanger but also as a radiation shield between the front wall 4 of the combustion chamber and the wall 13 of the casing. Customarily the burner control mechanism and other heater control mechanisms are mounted on the front wall 19 of the casing 13 and by reason of this radiation shield are prevented from becoming overheated, thus extending their life. The burner tube 20 and the combustion gas tubes 7 are also cooled by the air passing upwardly from the fan 17 between the front wall 4 of the combustion chamber and the casing wall 13 and are thereby cooled and their life extended.

A condition sometimes referred to as "short circuiting" has been found to exist when using the heater of Patent 2,529,574 wherein the combustion gases are withdrawn from the combustion chamber adjacent the bottom of the front wall thereof. This condition arises when, by reason of an excessive draft in the stack, the burning fuel is withdrawn from the combustion chamber before combustion is completed and may carry with it some of the fuel just entering the combustion chamber from the burner ring 20. This condition creates a lower efficiency in the heater by reason of failure to obtain complete combustion of the fuel and transfer of the heat thereof to the walls of the combustion chamber. By the use of the flue gas manifold 5 of the invention, the gaseous products of combustion are withdrawn from the chamber adjacent the top thereof in greatest spaced relation to the burner providing ample time for combustion of the fuel and creating a circulation of the gases causing them, in a sense, to scrub the side walls and top walls of the combustion chamber in passing from the rear of the combustion to the front thereof and out through the manifold 5.

While I have shown in detail the best mode, presently contemplated, for constructing the heater and flue gas manifold 5, it will be understood that many changes in details of construction will suggest themselves to those skilled in the art and it is to be understood that the exact details of construction used are for purposes of illustration and not limitation except as made necessary by the scope of the appended claim.

I claim:

In a space heater having an enclosing casing, a combustion chamber disposed within said casing with the walls thereof in spaced relation to the casing walls, means forming an air outlet in the top of said casing, and a blower disposed beneath said chamber for forcing air upwardly and about said chamber in passage through said casing to said outlet, the combination of a vertically disposed front wall on said chamber extending in spaced relation to an adjacent casing wall, a manifold disposed between said chamber and casing wall in spaced relation to both and extending from beneath to the vertical height of the chamber, a plurality of conduits spaced transversely of the manifold adjacent the top thereof connecting the interior of the said chamber with the interior of the manifold providing passage of combustion gases from the combustion chamber to the manifold, a plurality of conduits disposed beneath the combustion chamber and connected with the manifold for carrying combustion gases from the manifold rearwardly beneath the combustion chamber in the path of the entering air from the blower, and a burner tube extending through said casing wall, manifold, and said front wall of the combustion chamber for housing a burner for injection of combustible fuel into the combustion chamber.

References Cited in the file of this patent

UNITED STATES PATENTS

| | | |
|---|---|---|
| 361,841 | Shriver | Apr. 26, 1887 |
| 2,037,070 | Frentzel | Apr. 14, 1936 |
| 2,390,380 | McCollum | Dec. 4, 1945 |
| 2,529,574 | Rush | Nov. 14, 1950 |
| 2,555,842 | De Lancey | June 5, 1951 |
| 2,715,399 | Witt et al. | Aug. 16, 1955 |